(12) United States Patent
Larson et al.

(10) Patent No.: US 7,957,858 B1
(45) Date of Patent: Jun. 7, 2011

(54) METHOD FOR DETERMINING PROJECTED OBSTACLE AREAS FOR MOVING OBSTACLES

(75) Inventors: Jacoby R. Larson, San Diego, CA (US); Michael H. Bruch, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 773 days.

(21) Appl. No.: 12/036,441

(22) Filed: Feb. 25, 2008

Related U.S. Application Data

(60) Provisional application No. 60/916,452, filed on May 7, 2007.

(51) Int. Cl.
*G08G 1/16* (2006.01)
(52) U.S. Cl. ........... 701/23; 701/301; 340/435; 340/436
(58) Field of Classification Search .................... 701/23, 701/301–302, 96; 340/435–436
See application file for complete search history.

(56) References Cited

U.S. PATENT DOCUMENTS

| | | | |
|---|---|---|---|
| 6,055,042 A * | 4/2000 | Sarangapani | 356/4.01 |
| 7,296,530 B1 * | 11/2007 | Bernstein et al. | 114/322 |
| 7,299,130 B2 * | 11/2007 | Mulligan et al. | 701/213 |
| 2005/0043925 A1 * | 2/2005 | Hepner et al. | 702/185 |
| 2005/0225477 A1 * | 10/2005 | Cong et al. | 342/70 |
| 2009/0216444 A1 * | 8/2009 | Crowell | 701/213 |

* cited by examiner

*Primary Examiner* — Yonel Beaulieu
(74) *Attorney, Agent, or Firm* — Ryan J. Friedl; Kyle Eppele

(57) ABSTRACT

A method involves calculating a closest point of approach (CPA) between a vehicle and a moving obstacle, determining the CPA is within a pre-determined distance from the vehicle at a point in time along the vehicle path, calculating a projected obstacle area (POA) for the moving obstacle, and modifying the vehicle path so the vehicle avoids the POA. The POA is a polygonal region between the boundaries calculated by determining a first point in time along the obstacle path that the moving obstacle is within the pre-determined distance, determining a second point in time along the obstacle path that the moving obstacle is within the pre-determined distance, creating a first line on one side of a midpoint line based upon a pre-determined angle of uncertainty, and creating a second line on the other side of the midpoint line based upon the pre-determined angle of uncertainty.

28 Claims, 14 Drawing Sheets

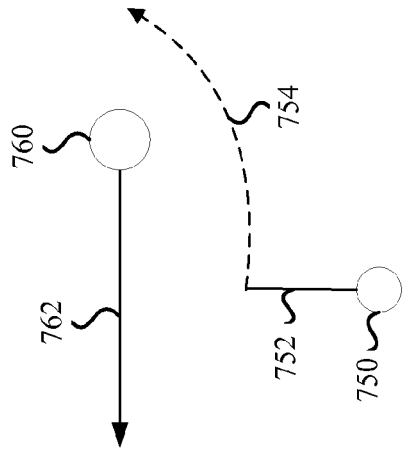
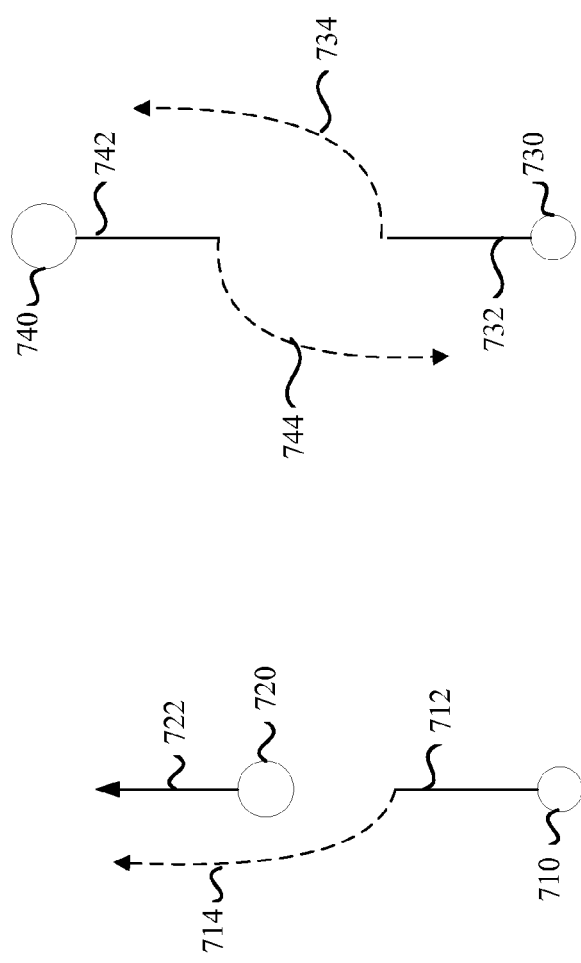
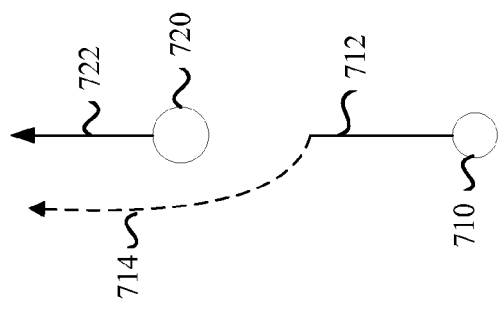
FIG. 8C
FIG. 8B
FIG. 8A

METHOD FOR DETERMINING PROJECTED OBSTACLE AREAS FOR MOVING OBSTACLES

PRIORITY

This application claims the benefit of U.S. Provisional Patent Application Ser. No. 60/916,452, filed May 7, 2007, entitled "Obstacle Avoidance System and Projected Obstacle Area," the content of which is fully incorporated by reference herein.

FEDERALLY SPONSORED RESEARCH AND DEVELOPMENT

The Method for Determining Projected Obstacle Areas for Moving Obstacles is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case No. 98507.

CROSS REFERENCE TO RELATED APPLICATIONS

This application is related to U.S. Non-provisional patent application Ser. No. 11/956,209, filed Dec. 13, 2007, entitled "Obstacle Avoidance System and Method", the content of which is fully incorporated by reference herein.

BACKGROUND

Typical obstacle avoidance systems and methods do not determine routes using information about moving obstacles, as it is difficult to plan around an obstacle occupying different locations at different times. There is a current need for a system and method that can determine the projected location of moving obstacles.

BRIEF DESCRIPTION OF THE DRAWINGS

FIGS. 8A-8C show diagrams of modifications to vehicle paths to comply with the rules of a vehicle's operating environment, in accordance with the Method for Determining Projected Obstacle Areas for Moving Obstacles.

DETAILED DESCRIPTION OF SOME EMBODIMENTS

Figure 1:
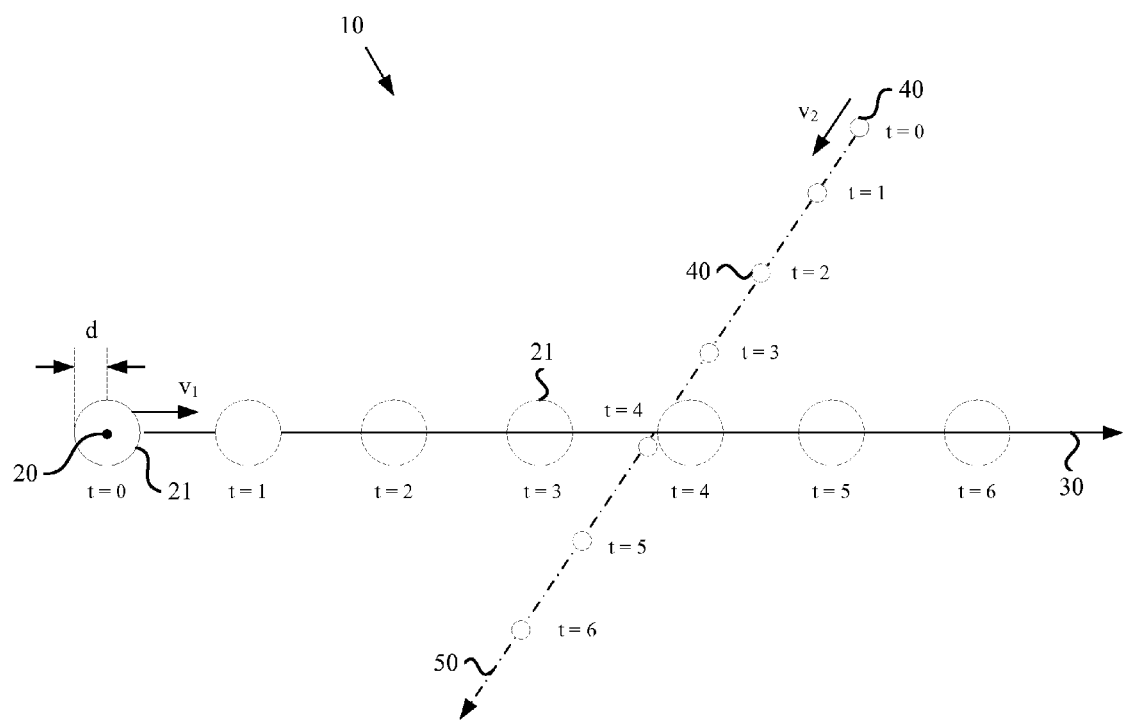
FIG. 1 shows a diagram of time-elapsed positions of a vehicle on a vehicle path and a moving obstacle on an obstacle path, in accordance with one embodiment of the Method for Determining Projected Obstacle Areas for Moving Obstacles.

Referring to FIG. 1, there is shown a diagram 10 illustrating time-elapsed positions of a vehicle 20 on a vehicle path 30 and a moving obstacle 40 on an obstacle path 50, in accordance with one embodiment of the Method for Determining Projected Obstacle Areas for Moving Obstacles. Vehicle 20 has a velocity of $v_1$, while moving obstacle 40 has a velocity of $v_2$. Velocities $v_1$ and $v_2$ may be any positive or negative value and may vary depending on the type of vehicle/moving obstacle. In some embodiments, the method utilizes a vehicle region 21 when making determinations/calculations. Vehicle region 21 may comprise the region surrounding vehicle 20 and extending a distance d. In some embodiments, distance d may be a pre-determined distance as set by a user of a system incorporating the method. Distance d may vary depending on the desired safety factor for vehicle 20. Although vehicle region 21 is shown as a circle, vehicle region 21 may comprise various shapes depending on the shape of vehicle 20. FIG. 1 shows vehicle 20 and moving obstacle 40 at times along vehicle path 30 and obstacle path 40, respectively, varying from times t=0 to t=6. As shown, vehicle region 21 and moving obstacle 40 are in closest proximity at about t=4.

Figure 2:
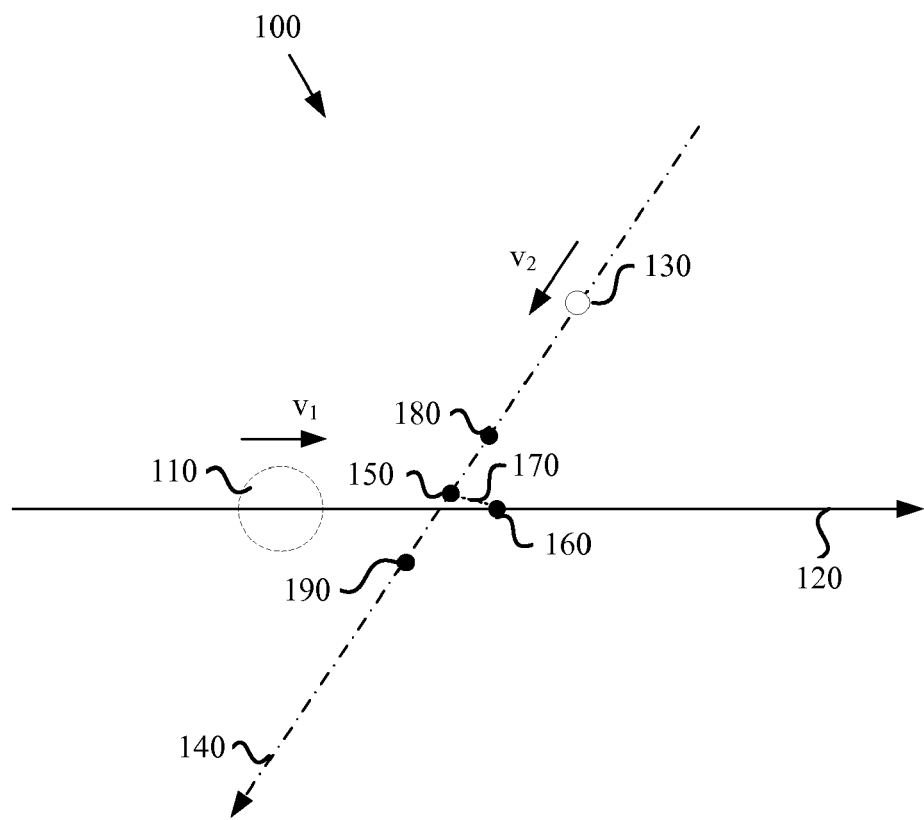
FIG. 2 shows a diagram illustrating the determination of the points required for determination of a projected obstacle area, in accordance with one embodiment of the Method for Determining Projected Obstacle Areas for Moving Obstacles.

FIG. 2 shows a diagram 100 illustrating the determination of the points required for the determination of a projected obstacle area (POA), in accordance with one embodiment of the Method for Determining Projected Obstacle Areas for Moving Obstacles. A POA may be defined as the area a moving obstacle may occupy at a future time period. The determination of a POA focuses on the time when a moving obstacle poses the greatest threat to a vehicle. The greatest threat to a vehicle may be determined by initially finding the closest point of approach (CPA). The CPA may be defined as the shortest distance between two objects in time along their respective paths.

As shown, a vehicle region 110 is traveling along a vehicle path 120 with a velocity of $v_1$, while a moving obstacle 130 is traveling along an obstacle path 140 with a velocity of $v_2$. Vehicle region 110 includes a vehicle (not shown) and a region surrounding the vehicle and extending a distance d, which may be a pre-determined distance. The CPA, shown in FIG. 2 as reference 150, lies along obstacle path 140. CPA 150 may be determined in accordance with step 1010 of method 1000 as discussed herein, wherein a shortest distance 170 is found between the paths of vehicle 110 along vehicle path 120 and moving obstacle 130 along obstacle path 140. As shown, shortest distance 170 occurs between CPA 150 along obstacle path 140 and point 160 along vehicle path 120.

Also shown in diagram 100 are points 180 and 190. Point 180 represents a first point in time along obstacle path 140 that moving obstacle 130 is within a pre-determined distance from the vehicle, such as distance d. In some embodiments, point 180 is farther from vehicle 110 than CPA 150. In some embodiments, point 180 is the first point in time in which moving obstacle 130 is within the pre-determined distance from the vehicle, or within vehicle region 110. Point 190 represents a second point in time along obstacle path 140 where moving obstacle 130 is within the pre-determined distance from the vehicle, or within vehicle region 110. In some embodiments, point 190 is farther from point 180 than CPA 150. In some embodiments, point 190 is the last point in time in which moving obstacle 130 is within the pre-determined distance from the vehicle, or within vehicle region 110. Points 180 and 190, along with CPA 150, are used in the determination of a POA, as discussed below with reference to FIG. 3.

Figure 3:
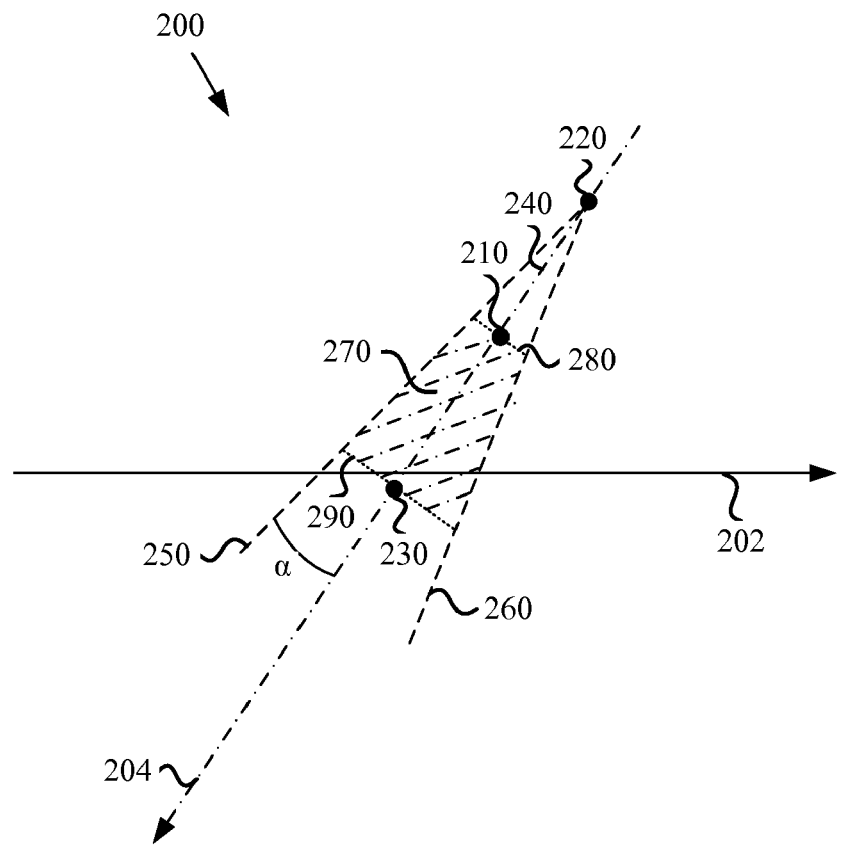
FIG. 3 shows a diagram illustrating the determination of a projected obstacle area, in accordance with one embodiment of the Method for Determining Projected Obstacle Areas for Moving Obstacles.
Figure 7E:
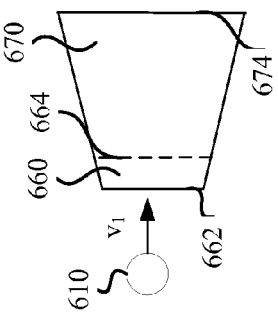
FIGS. 7A-7E show diagrams of modifications to projected obstacle areas in response to moving obstacles, in accordance with one embodiment of the Method for Determining Projected Obstacle Areas for Moving Obstacles.

FIG. 3 shows a diagram 200 illustrating the determination of a POA, in accordance with one embodiment of the Method for Determining Projected Obstacle Areas for Moving Obstacles. Diagram 200 includes a vehicle path 202, an obstacle path 204, a CPA 210, a first point 220, a second point 230, a midpoint line 240, a first line 250, a second line 260, and a POA 270. Midpoint line 240 extends at least from first point 220 through CPA 210, to second point 230. First line 250 and second line 260 are each separated from midpoint line 240 by $\alpha$ degrees, where $\alpha$ represents the estimated angle of uncertainty of the positioning of a moving obstacle (not shown). In some embodiments, estimated angle of uncertainty $\alpha$ may be predetermined by a user of the method. As an example, estimated angle of uncertainty $\alpha$ may be 15 degrees. In other embodiments, estimated angle of uncertainty $\alpha$ may vary between about 5 and about 35 degrees, depending on factors such as the type of moving obstacle, the velocity of the moving obstacle, and the rules of the vehicle's operating environment to be followed with respect to moving obstacles. In some embodiments, line 250 may be separated from line 240 at a different angle of uncertainty $\alpha$ than the angle of uncertainty $\alpha$ at which line 260 is separated from line 240. Examples of such an angle differentiation are shown in FIGS. 7B and 7C as discussed herein. In some embodiments, the distance of the POA, shown in FIG. 3 as the distance between 280 to line 290, may be modified to compensate for changes in the velocity of the moving obstacle. An example of such a modification is shown and described with reference to FIGS. 7D and 7E as discussed herein.

POA 270 may comprise the polygonal region between first line 250, second line 260, CPA 210, and second point 230. As shown, POA 270 comprises the cross-hatched polygonal region between first line 250, second line 260, line 280, and line 290. In some embodiments, the POA is determined based upon the vehicle path and the time required by the vehicle to traverse the vehicle path. In some embodiments, the POA may be updated or re-determined after a pre-determined time period, such as between about 1 to about 3 seconds.

Figure 4:
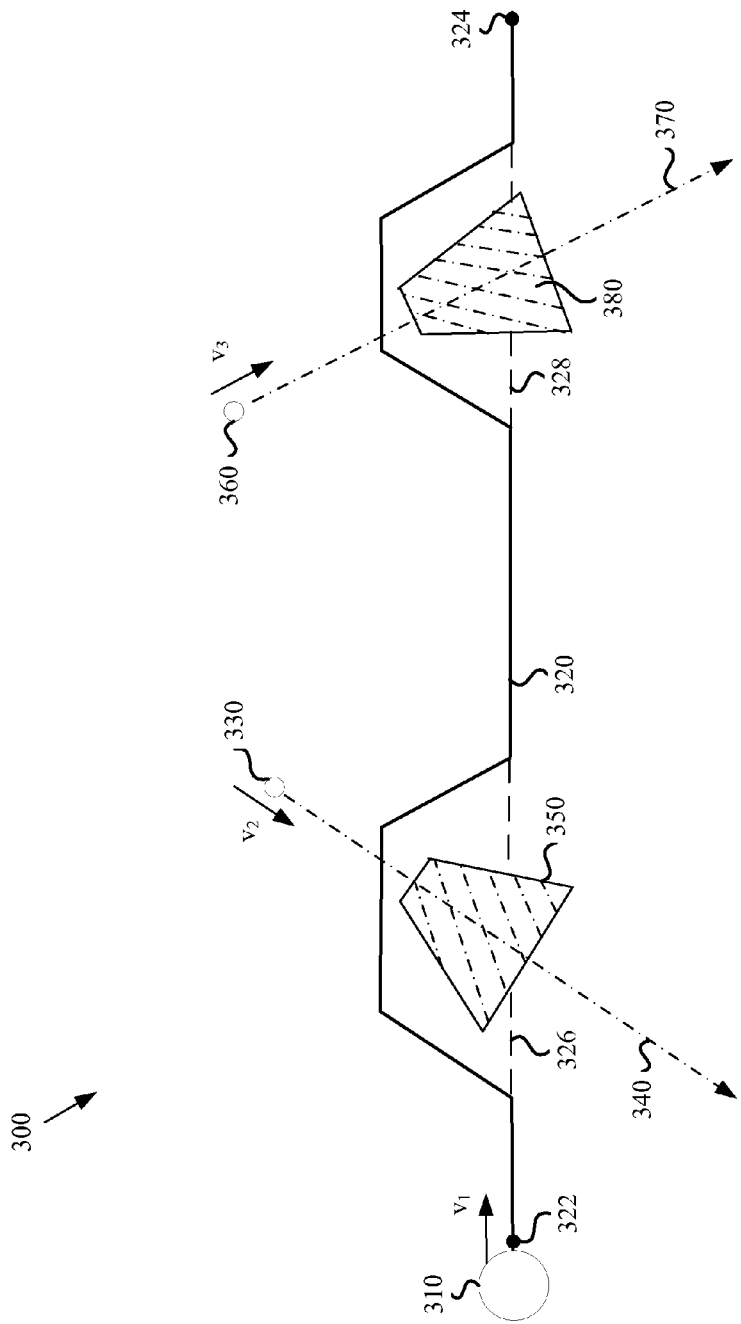
FIG. 4 shows a diagram illustrating the modification of the vehicle path such that the vehicle avoids determined projected obstacle areas, in accordance with one embodiment of the Method for Determining Projected Obstacle Areas for Moving Obstacles.

FIG. 4 shows a diagram 300 illustrating the modification of the vehicle path such that the vehicle avoids the determined POAs, in accordance with one embodiment of the Method for Determining Projected Obstacle Areas for Moving Obstacles. Diagram 300 includes a vehicle region 310 traveling along a vehicle path segment 320 with a velocity of $v_1$, while a moving obstacle 330 is traveling along an obstacle path 340 with a velocity of $v_2$, and another moving obstacle 360 is traveling along an obstacle path 370 with a velocity of $v_3$. Vehicle path segment 320 is shown in solid lines and has a start point 322 and an end point 324. Vehicle paths may contain multiple vehicle path segments 320. Vehicle region 310 includes a vehicle (not shown) and a region surrounding the vehicle and extending a distance d, which may be a pre-determined distance. Diagram 300 illustrates an example of a modification to vehicle path segment 320 due to POA 350 of moving obstacle 330 and POA 380 of moving obstacle 360. As shown, vehicle path segment 320 was modified from original portion 326 (shown as a dotted line) in response to POA 350 and from original portion 328 (shown as a dotted line) in response to POA 380. The revised vehicle path segment 320 allows vehicle region 310 to pass behind moving obstacles 330 and 360, in accordance with the rules of the operating environment of vehicle region 310. In some embodiments, vehicle region 310, including the vehicle, promptly returns to the original vehicle path after avoiding a POA of a moving obstacle. In embodiments where the vehicle may not return exactly to the original vehicle path, the vehicle returns as close as possible to the original vehicle path.

Figure 5:
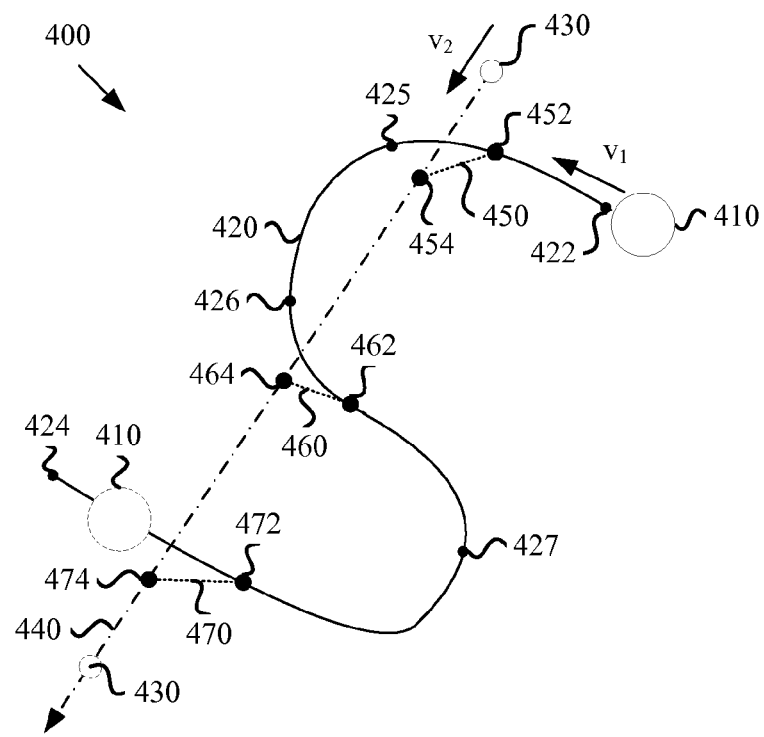
FIG. 5 shows a diagram illustrating the determination of a closest point of approach for multiple vehicle path segments, wherein the vehicle path and moving obstacle path intersect, in accordance with one embodiment of the Method for Determining Projected Obstacle Areas for Moving Obstacles.

FIG. 5 shows a diagram 400 illustrating the determination of a CPA for multiple vehicle path segments, wherein the vehicle path and moving obstacle path intersect, in accordance with one embodiment of the Method for Determining Projected Obstacle Areas for Moving Obstacles. Diagram 400 includes a vehicle region 410 traveling along a vehicle path 420 with a velocity of $v_1$, while a moving obstacle 430 is traveling along an obstacle path 440 with a velocity of $v_2$. Vehicle path has a start point 422 and an end point 424. As shown, vehicle path 420 contains four vehicle path segments—one from start point 422 to point 425, one from point 425 to point 426, one from point 426 to point 427, and one from point 427 to end point 424. Points 422, 424, 425, 426, and 427 may be referred to as "waypoints", wherein a waypoint is any point in the path of the vehicle. Thus, a vehicle path segment may be defined as a segment of a vehicle path between two waypoints. As such, various vehicle path segments may have various lengths. Initially, a vehicle path may be set by a user and may follow several waypoints along which a user desires the vehicle to travel. The vehicle path segment lengths may vary depending on the chosen waypoints. As an example, for a water-based vehicle, a vehicle path segment length may be 100 meters. However, shorter and longer vehicle path segments are possible depending on the type of vehicle and the vehicle's operating environment. Vehicle region 410 includes a vehicle (not shown) and a region surrounding the vehicle and extending a distance d, which may be a pre-determined distance. Vehicle path 420 intersects obstacle path 440 at three locations along obstacle path 440, creating three CPAs 454, 464, and 474. CPA 454 results from the first shortest distance 450 calculated between points 452 and 454. CPA 464 results from the second shortest distance 460 calculated between points 462 and 464. CPA 474 results from the third shortest distance 470 calculated between points 472 and 474.

Figure 6:
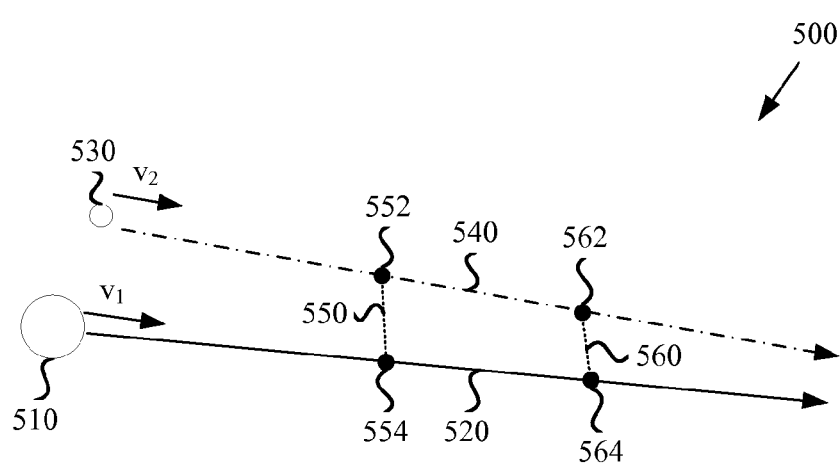
FIG. 6 shows a diagram illustrating the determination of the closest point of approach for a vehicle path segment which does not intersect with a moving obstacle path segment, in accordance with one embodiment of the Method for Determining Projected Obstacle Areas for Moving Obstacles.

FIG. 6 shows a diagram 500 illustrating the determination of the CPA for a vehicle path segment which does not intersect with a moving obstacle path segment, in accordance with one embodiment of the Method for Determining Projected Obstacle Areas for Moving Obstacles. Diagram 500 includes a vehicle region 510 traveling along a vehicle path 520 with a velocity of $v_1$, while a moving obstacle 530 is traveling along an obstacle path 540 with a velocity of $v_2$. As shown, vehicle path 520 and obstacle path 540 travel adjacent to one another and do not currently intersect. Therefore, there may be several points along obstacle path 540 that are within some predetermined distance from vehicle region 510. As an example, at a first time period point 552 represents a predetermined distance with vehicle region 510, with shortest distance 550 existing between point 552 and point 554. Then, at a second time period, point 562 represents a predetermined distance with vehicle region 510, with shortest distance 560 existing between point 562 and point 564.

FIGS. 7A-7E show diagrams of modifications to POAs in response to the trajectory of a moving obstacle with reference to the vehicle and the rules of the vehicle's operating environment, in accordance with one embodiment of the Method for Determining Projected Obstacle Areas for Moving Obstacles. The modifications discussed with reference to FIGS. 7A-7E may be used for vehicles operating in various environments, such as land-based environments, air-based environments, and water-based environments. For illustrative purposes, FIGS. 7A-7E will be discussed with reference to a vehicle, such as a boat or ship, capable of operating within a water-based environment. To influence the path planning algorithm and to make it more costly for the vehicle to deviate from the rules of the vehicle's operating environment, the POA is modified with respect to the angle of uncertainty and/or the distance of uncertainty. In some embodiments, the uncertainty angle on at least one side of the POA is increased to account for the rules of the vehicle's operating environment. In other embodiments, the ahead distance of the POA is increased. In other embodiments, the astern distance of the POA is increased.

Figure 7D:
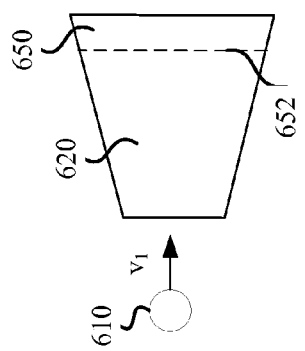
Figure 7C:
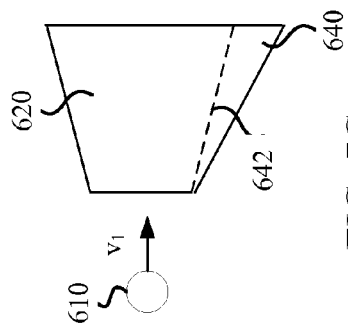
Figure 7B:
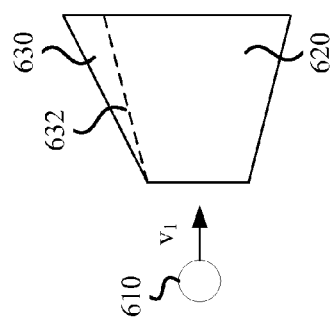
Figure 7A:
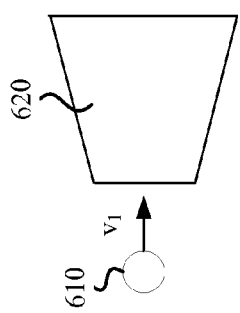

FIG. 7A illustrates a determined POA 620 given the positioning of a moving obstacle 610 having a velocity of $v_1$. FIG. 7B illustrates a determined POA with an increased angle of uncertainty on the port side. Such a modification to the angle of uncertainty would make it more difficult or costly for a path planning algorithm to select a route that passes on the moving obstacle's port side. As shown in FIG. 7B, the modified POA includes POA 620 plus region 630, which lies opposite dotted line 632 representing the unmodified boundary of POA 620. FIG. 7B shows a POA modified by increasing the port angle due to the rules of the vehicle's operating environment.

FIG. 7C shows a POA modified by increasing the angle of uncertainty on the starboard side (starboard angle). The POA in FIG. 7C includes POA 620 and region 640, which lies opposite dotted line 642 representing the unmodified boundary of POA 620. FIG. 7C illustrates a determined POA given that the vehicle is either approaching moving obstacle 610 in a head-on course or approaching from behind. In response, the methods discussed herein may alter POA 620 by increasing the angle of uncertainty on the starboard side to create a modified POA to make it more difficult or costly for a path planning algorithm to select a route that passes moving obstacle 610 on the starboard side. The rules of the vehicle's operating environment dictate that if the vehicle is approaching the moving obstacle head on, it should pass port to port and if it is approaching it in the same heading from behind, it should also pass on the port side of the moving obstacle. The modification of increasing the angle of uncertainty on the starboard side of the POA influences the vehicle route such that the vehicle follows the rules of the vehicle's operating environment.

FIG. 7D shows a modified POA due to an increase in moving obstacle 610's ahead distance, or an increased forward speed. The POA in FIG. 7D includes POA 620 and region 650, which lies opposite dotted line 652 representing the unmodified boundary of POA 620. The modification shown in FIG. 7D influences the vehicle to follow the rules of the vehicle's operating environment when the moving obstacle is crossing in front of the vehicle. As the POA is modified to increase the distance in front of the moving obstacle, the path planning algorithm would find it less costly to plan a route behind the vehicle. FIG. 7E shows a modified POA due to an increase in moving obstacle 610's astern distance, or a reduction of forward speed. The POA in FIG. 7E comprises POA 670, which results from subtracting region 660, bounded in part by lines 662 and 664, from original POA 620 (shown in FIG. 7A), with lines 664 and 674 serving in part as the new boundary lines for POA 670.

FIGS. 8A-8C show diagrams of modifications to vehicle paths to comply with the rules of the vehicle's operating environment, in accordance with the Method for Determining Projected Obstacle Areas for Moving Obstacles. The methods discussed herein may be used for vehicles operating in various environments, such as land-based environments, air-based environments, and water-based environments. For illustrative purposes, FIGS. 8A-8C will be discussed with reference to a vehicle, such as a boat or ship, capable of operating within a water-based environment. As an example, the rules of the water-based vehicle's operating environment may include navigation rules as defined in the 1972 International Regulations for Preventing Collisions at Sea ("Rules"). The Rules mandate that, when overtaking another water-based vehicle, the overtaking vehicle must pass on the port side of the other vehicle. FIG. 8A illustrates this concept, where a vehicle 710 along an original vehicle path 712 encounters a moving obstacle 720 along an obstacle path 722. The methods discussed herein modify the path 712 of vehicle 710 to path 714 (shown by dotted line) to overtake moving obstacle 720 on the port side of moving obstacle 720 in compliance with the Rules.

As another example, the Rules mandate that when two vehicles are meeting head-on, both vehicles shall alter course to starboard so that each vehicle passes on the port side of the other vehicle. FIG. 8B illustrates this concept, where a vehicle 730 along an original vehicle path 732 encounters a moving obstacle 740 along an original obstacle path 742. The path 732 of vehicle 730 is modified to path 734 (shown by dotted line) to pass moving obstacle 740 on the port side of moving obstacle 740, while the path 742 of moving obstacle 740 is modified to path 744 (shown by dotted line) to pass vehicle 730 on the port side of vehicle 730, in compliance with the Rules.

As a further example, the Rules mandate that when two vehicles are crossing, the vehicle that has the other on its starboard side shall keep out of the way and avoid crossing in front of the other vehicle. FIG. 8C illustrates this concept, where a vehicle 750 along an original vehicle path 752 encounters a moving obstacle 760 along an obstacle path 762. Vehicle 750 has its path 752 modified to path 754 (shown by dotted line) to cross the path of moving obstacle 760 behind moving obstacle 760, in compliance with the Rules.

Figure 9:
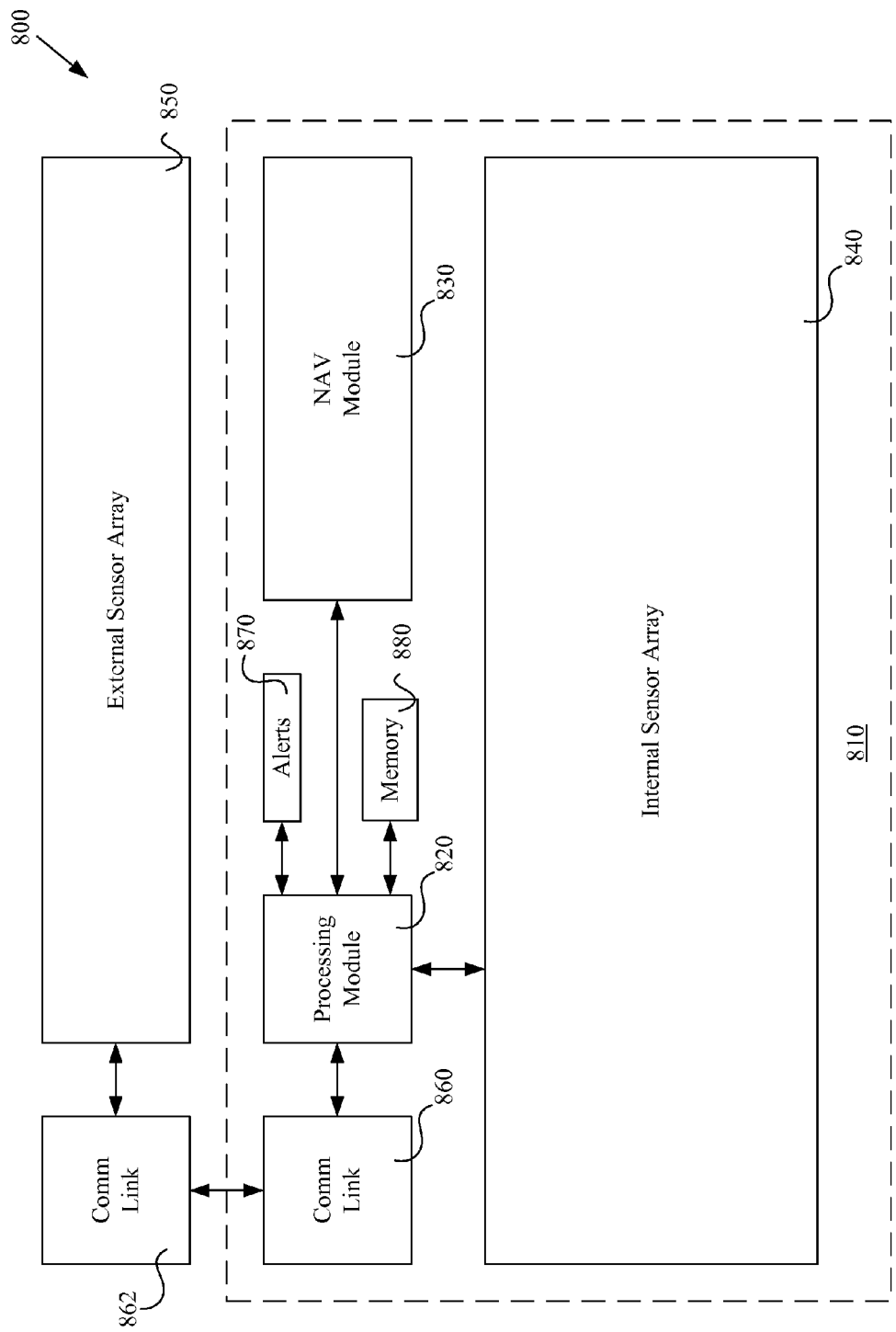
FIG. 9 shows a block diagram of an embodiment of a system that may be used to implement an embodiment of the Method for Determining Projected Obstacle Areas for Moving Obstacles.

FIG. 9 shows a block diagram 800 of an embodiment of an Obstacle Avoidance System (OAS) that may be used to implement the methods for determining projected obstacle areas for moving obstacles as discussed herein, including methods 1000, 1100, and 1200. OAS 800 may include hardware modules for implementing the methods for determining projected obstacle areas for moving obstacles while traveling from an origination location to a destination location using a far-field module designed to determine a revised route based on an original present route. In one embodiment, the OAS includes a near-field module and a far-field module, wherein the far-field module is designed to determine a revised route based on an original present route.

As shown in FIG. 8, OAS 800 includes Onboard Obstacle Avoidance Module (OOAM) 810, communication link 862 and external sensor array 850. OOAM 810 is designed to reside on and/or in a vehicle such as an Unmanned Surface Vehicle (USV). A USV may be a vehicle designed to travel on the surface of a body of liquid. Examples of USVs are a boat and a hydrofoil. In other embodiments, OOAM 810 may be used in other vehicles without departing from the spirit and scope of the OAS. In some embodiments, the vehicle may be a land-based vehicle, such as a car or jeep. In some embodiments, the vehicle may be a water-based vehicle, such as a boat or ship. In some embodiments, the vehicle may be an air-based vehicle, such as a helicopter or plane. OOAM 810 may include a processing module 820, navigation (NAV) module 830, internal sensor array 840, communication link 860 and alerts module 870.

Processing module 820 may comprise a general-purpose computing device such as a microprocessor or a conventional personal computer. Processing module 820 may be operatively connected to NAV module 830, internal sensor array 840, communication link 860, and alerts module 870. Processing module 820 may receive information from internal sensor array 840 and an external sensor array 850, process information and transmit control commands to NAV module 830, and transmit alert commands to alerts module 870. Processing module 820 may send data to and retrieve data from memory 880. Memory 880 may be any form of memory as recognized by one having ordinary skill in the art, including but not limited to RAM, ROM, PROM, EPROM, EEPROM, DRAM, and SDRAM.

In some embodiments, NAV module 830 is designed to navigate a vehicle, such as a USV, by receiving and executing routes for the vehicle. NAV module 830 may be operatively connected to processing module 820. NAV module 830 receives present route information and revised route information from processing module 820. Then, as an example, NAV module 830 may use the present route information to change the direction, velocity, and/or turn rate of the vehicle by transmitting signals to a driver module which may activate the actuators of the vehicle. NAV module 830 may comprise an embedded or standard PC computer.

OAS 800 may include a sensor array including at least one sensor for sensing obstacle information about at least one moving obstacle. In one embodiment, the sensor array may be an internal sensor array, such as internal sensor array 840. In one embodiment, the sensor array may be an external sensor array, such as external sensor array 850. In one embodiment, the sensor array may include an internal sensor array 840 and an external sensor array 850. Internal sensor array 840 includes at least one sensor that resides in and/or on a USV. Exemplary sensors of internal sensor array 840 may include the following: magnetometer, LADAR, pan/tilt video camera, antenna automatic identification system (AIS), GPS, millimeter wave RADAR, RADAR, monocular vision camera, stereo vision camera, SONAR, gyroscope, compass and accelerometer. Internal sensor array 840 is designed to obtain information regarding obstacles and/or conditions in the area of OOAM 810. Internal sensor array 840 may be operatively connected to processing module 820. Internal sensor array 840 may transmit information regarding moving or stationary obstacles to processing module 820.

Processing module 820 may transmit information to internal sensor array 840 depending on the type of internal sensor of internal sensor array 840. For example, processing module 820 may transmit a tilt command to a pan/tilt video camera of internal sensor array 840. Processing module may be operatively connected to communication link 860. Processing module 820 may transmit information to external sensor array 850 via communication link 860. Processing module 820 may be configured to perform methods 1000, 1100, and 1200 as described herein.

In some embodiments, external sensor array 850 is designed to obtain information regarding obstacles in the area of OOAM 810. Exemplary sensors of internal sensor array 840 include the following: shore-based RADAR, ship-based RADAR, aircraft-based RADAR, ship-based SONAR, weather satellite and aerial photographic platforms. External sensor array 850 may transmit information regarding obstacles and/or conditions to processing module 820 via communication links 862, 860. Processing module 820 may transmit information to external sensor array 850 depending on the type of internal sensor of external sensor array 840.

External sensor array 850 may be operatively connected to OOAM 810 via communication link 862. Examples of communication link 862 include a satellite transceiver, radio transceiver and cellular transceiver. Separate components of external sensor array 850 may be operatively connected to OOAM 810 via separate communication links of communication link 860. For example a shore-based RADAR sensor of external sensor array 850 may be linked to OOAM 810 via a satellite transceiver of communication link 862 and an unmanned aerial vehicle RADAR of external sensor array 850 may be linked to OOAM 810 via a radio transceiver of communication link 862. Both internal sensor array 840 and external sensor array 850 are not limited in the amount and type of sensors that may be comprised therein. Further, internal sensor array 840 and external sensor array 850 may be configured to readily allow for the addition of one or more sensors.

Communication link 860 receives and transmits communication signals. Communication link 860 may be operatively connected to processing module 820. Communication link 860 may also be operatively connected to the sensor array, such as internal sensor array 840 and/or external sensor array 850. Examples of communication link 860 include a satellite transceiver, radio transceiver and cellular transceiver. Communication link 860 may comprise a combination of components such as a combination of a satellite transceiver, radio transceiver and cellular transceiver. Communication link 862 may be operatively connected to communication link 860.

Alerts module 870 may be operatively connected to processing module 820. Alerts module 870 may include at least one alert such as a visual alert, audible siren and/or alphanumeric message. In some embodiments, alerts module 870 is designed to receive an alert message from processing module 820 and activate the alert associated with the alert message. As an example, processing module 820 may transmit an alert message to alerts module 870 if the vehicle detects a hazardous condition, such as an imminent collision or unsafe route. Alerts module 870 may also display an alert to a user if an internal system failure has occurred, such as a mechanical, sensor, or module failure. Alerts module 870 may also display an alert to a user if the revised route intersects a moving or stationary obstacle or the vehicle travels into restricted territories.

Figure 10:
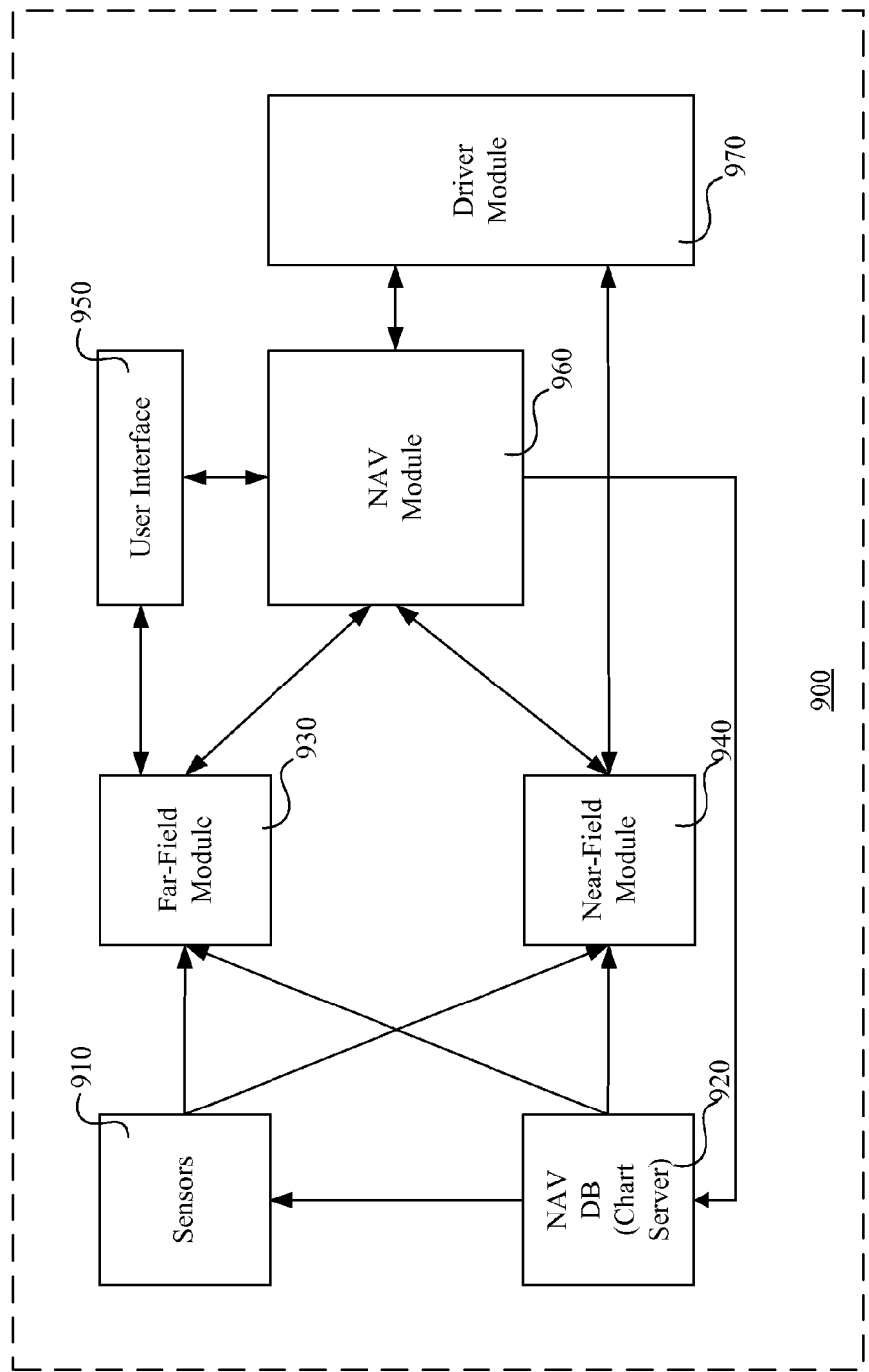
FIG. 10 shows a block diagram of an embodiment of a system that may be used to implement an embodiment of the Method for Determining Projected Obstacle Areas for Moving Obstacles.

FIG. 10 shows a block diagram 900 of an embodiment of an OAS that may be used to implement the methods for determining projected obstacle areas for moving obstacles as discussed herein, including methods 1000, 1100, and 1200. As shown in FIG. 10, OAS 900 includes sensors 910, NAV database 920, far-field module 930, near-field module 940, user interface 950, NAV module 960 and driver module 970.

Sensors 910 include one or more sensors for sensing obstacle information about at least one moving obstacle and at least one stationary obstacle. The at least one moving obstacle may be located outside of a predetermined distance from the present vehicle location. The predetermined distance may be determined based upon the speed of the vehicle and the amount of time required by far-field module 930 to determine a revised route. As an example, for a water-based vehicle, the predetermined distance may be between about 300 meters and about 400 meters. Sensors 910 may include internal sensors and external sensors. In one embodiment, sensors 910 include internal sensors. In one embodiment, sensors 910 include external sensors. In one embodiment, sensors 910 include both internal and external sensors.

NAV database 920 may be operatively connected to near-field module 940 and far-field module 930 for providing permanent obstacle information to near-field module 940 and far-field module 930. NAV database 920 may include various servers providing information, including a chart server, a RADAR server, and a SONAR server. As an example, the chart server may provide nautical chart information regarding all of the stationary known permanent obstacles in a given area, such as a particular geographical region of the world. As another example, the RADAR server and SONAR server may provide information on all RADAR contacts and SONAR contacts, respectively. As a further example, an advanced radar plotting aid (ARPA) may provide information about moving obstacles.

Far-field module 930 may be operatively connected to sensors 910 for planning a route for a vehicle to avoid obstacles that are located outside of a predetermined distance from the present vehicle location. Near-field module 940 may be operatively connected to sensors 910 for planning a route for a vehicle to avoid obstacles located within a predetermined distance from the present vehicle location. Near-field module 940 and far-field module 930 may operate simultaneously and in conjunction with one another to produce an obstacle-free route for the vehicle. Near-field module 940 and far-field module 930 may be operatively connected to NAV module 960 to transmit routes to NAV module 960.

Far-field module 930 may determine a revised route by iterating through sections of a waypoint route for the vehicle. Iterations may occur at pre-determined user-selected intervals. During every section of the route, far-field module 930 may calculate the closest point of approach (CPA) for each moving contact it has information for. If during a section, far-field module 930 finds a CPA of a moving obstacle that is closer than a pre-determined distance, that obstacle may be characterized as a threat. The determination may then continue to find the last point in time that moving contact is still within some threat distance (still within the USV's route section). That last point along with the CPA is used as a basis for the POA. Then using the angle of error for the port and starboard side and the distance to either the CPA or last point, the outlying areas of the POA are created. A revised route may then be determined using the POA information.

Far-field module 930 may utilize a two-dimensional obstacle map in determining a revised route. The two-dimensional obstacle map may be an occupancy grid created by dividing the vehicle environment into a discrete grid and assigning each cell location a value representing the probability of being occupied or not occupied by an obstacle. The obstacle may contain information about stationary obstacles as well as moving obstacles. The planning of a route to avoid moving obstacles may include incorporating a third-dimension, time, into the two-dimensional obstacle map. To plan a route in a prompt manner, such as a few seconds, while accounting for moving obstacles, far-field module 930 may convert the third-dimension time into the two-dimensional obstacle map by determining the projected area traveled by the moving obstacle over a particular time period. Such a method may be similar to that disclosed by D. Rathbun, S. Kragelund, A. Pongpunwattana, and B. Capozzi in a document entitled "An Evolution Based Route Planning Algorithm for Autonomous Motion of a UAV through Uncertain Environments", from the Proceedings of $21^{st}$ Digital Avionics Systems Conference, vol. 2, pp. 8D2-1-8D2-12, Irvine, Calif. 2002.

Far-field module 930 may utilize the A* search algorithm developed by Peter Hart, Nils Nilsson, and Bertram Raphael in 1968 to assist with the route planning process. The A* search algorithm is able to find an optimal route solution in a relatively short amount of time. Also, the A* algorithm uses a cost analysis at each step, allowing for the insertion of an added cost for proximity to obstacles. The obstacle proximity cost allows the USV to set a safety barrier around obstacles, which can also be adjusted for different obstacles. The A* cost analysis also can be extended for other costs such as direction, shipping lanes, soft obstacles, route time, etc.

Far-field module 930 may use the Velocity Obstacle (VO) method described by P. Fiorini and Z. Schiller in a document entitled "Motion Planning in Dynamic Environments Using the Relative Velocity Paradigm", from the Proceedings of IEEE International conference on Robotics and Automation, vol. 1, pp. 560-565, Atlanta, Ga., 1993, to determine velocities of moving obstacles that may cause a collision with the vehicle. Use of the VO method allows for the velocity range and trajectory range of the vehicle to be set such that the vehicle avoids moving obstacles. The VO method transforms a moving obstacle into a stationary one by considering the relative velocity and trajectory of the vehicle with respect to the obstacle. After producing a collision area called the velocity obstacle, defined using the relative velocity vector, the algorithm returns a set of vehicle velocity vectors guaranteeing collision avoidance. This transformation and collision area detection, when applicable, reduces the complexity of the route planning among moving obstacles problem to linear time. The VO method may be used by far-field module 930 as a first pass to avoid moving obstacles. However, in the case that changing velocity doesn't avoid collisions, far-field module 930 may change the route by creating POAs for each obstacle and then determining a safe alternative route using the A* search as discussed above.

Near-field module 940 may cause the USV to deviate from the present route. If such an instance occurs, far-field module 930 may determine a revised route that seeks to return to the previous present route as soon as possible. Such a feature may allow for the removal of obsolete routes caused by volatile moving obstacles or unreliable contact information received from NAV database 920. Near-field module 940 cause the USV to avoid obstacles that are within a predetermined distance from the USV by intercepting any tele-operation or driving commands sent from NAV module 960 or driver module 970 to the actuators or other components of the USV responsible for steering the USV. After interception, near-field module 940 may then modify the commands in real-time, then transmit them to the appropriate destination, to prevent the USV from colliding with obstacles. Near-field module 940 may be implemented based upon a behavior-based common-world model approach, wherein all of the near-field sensors are fused into a common local-world model and individual behaviors vote on specific navigation solutions within that model. As an example, the obstacle avoidance behavior of near-field module 940 may vote for actions that avoid or turn away from potential hazards while the route-following behavior of near-field module 940 votes for actions that will keep the USV on the present route.

Near-field module 940 may utilize an arc-space model to assist in avoiding obstacles located within a predetermined distance from the present vehicle location. The arc-space approach has been used in real-world systems, such as the Mars Rovers, and has its lineage back to the Morphin algorithm and Distributed Architecture for Mobile Navigation (DAMN) of Carnegie Mellon University. As applied in an embodiment of an OAS, a number of arcs are projected in front of the vehicle over a local world-model obstacle map. The number of arcs considered is a function of the map size and grid spacing, with the arcs spaced such that one arc passes through each of the outer cells. This approach guarantees that each cell in the grid is covered by at least one arc so that all navigable paths are considered. Each of the arcs may be related to the vehicle velocity and turn rate by $$R = \frac{V}{\theta} \quad \text{(Eq. 1)}$$

where R is the radius of the arc, V is the vehicle velocity, and $\theta$ is the vehicle turn rate. For the obstacle avoidance behavior, each arc is given a weight or vote based on the distance the vehicle could travel along that arc before it encountered an obstacle. The longer arcs are weighted more favorably than the shorter arcs or arcs that are blocked near the vehicle. The votes may be are scaled from 0 to −1 so that they can be combined with votes from other navigation behaviors.

One common navigation behavior is waypoint navigation or route following. The waypoint navigation function produces a commanded turn rate and velocity based on the heading error between the vehicle's current heading and the heading toward the vehicle destination point along the route. At each cycle these turn-rate and velocity commands from the waypoint navigation function are converted into an arc. To form votes for the entire array of arcs, the primary arc is given the maximum value and votes for arcs on either side of it are linearly decreased until they reach a value of zero. The route following behavior does not vote against any arcs. Other arc-voting behaviors may be used to help navigate around obstacles. For example, these behaviors include a free-space behavior that votes (from 1 to 0) for large continuous sections of arcs that are unblocked, essentially open areas in the obstacle map. This behavior also votes for open arcs that fall between obstacles so that the vehicle will not always favor going around groups of obstacles. Weighting factors may be applied to the votes from each of the behaviors prior to combining them, so that some behaviors contribute more to the final outcome than other behaviors. In one embodiment, the obstacle avoidance behavior is weighted about three times heavier than any of the other behaviors.

User interface 950 may be operatively connected to NAV module 960 and far-field module 930 for allowing a user to accept and decline the routes for the vehicle. User interface 950 may be a software application similar to the multi-robot operator control unit (MOCU) developed by the U.S. Navy, which is an interface for viewing data in the form of maps, gauges, video, and vehicle location and then controlling and interfacing with the vehicle and sensor's location, actions, and properties. NAV module 960 may be operatively connected to near-field module 940 and far-field module 930 for receiving routes for the vehicle. Driver module 970 may be operatively connected to NAV module 960 for receiving driving commands from the NAV module 960 and controlling the driving of the vehicle.

Figure 11:
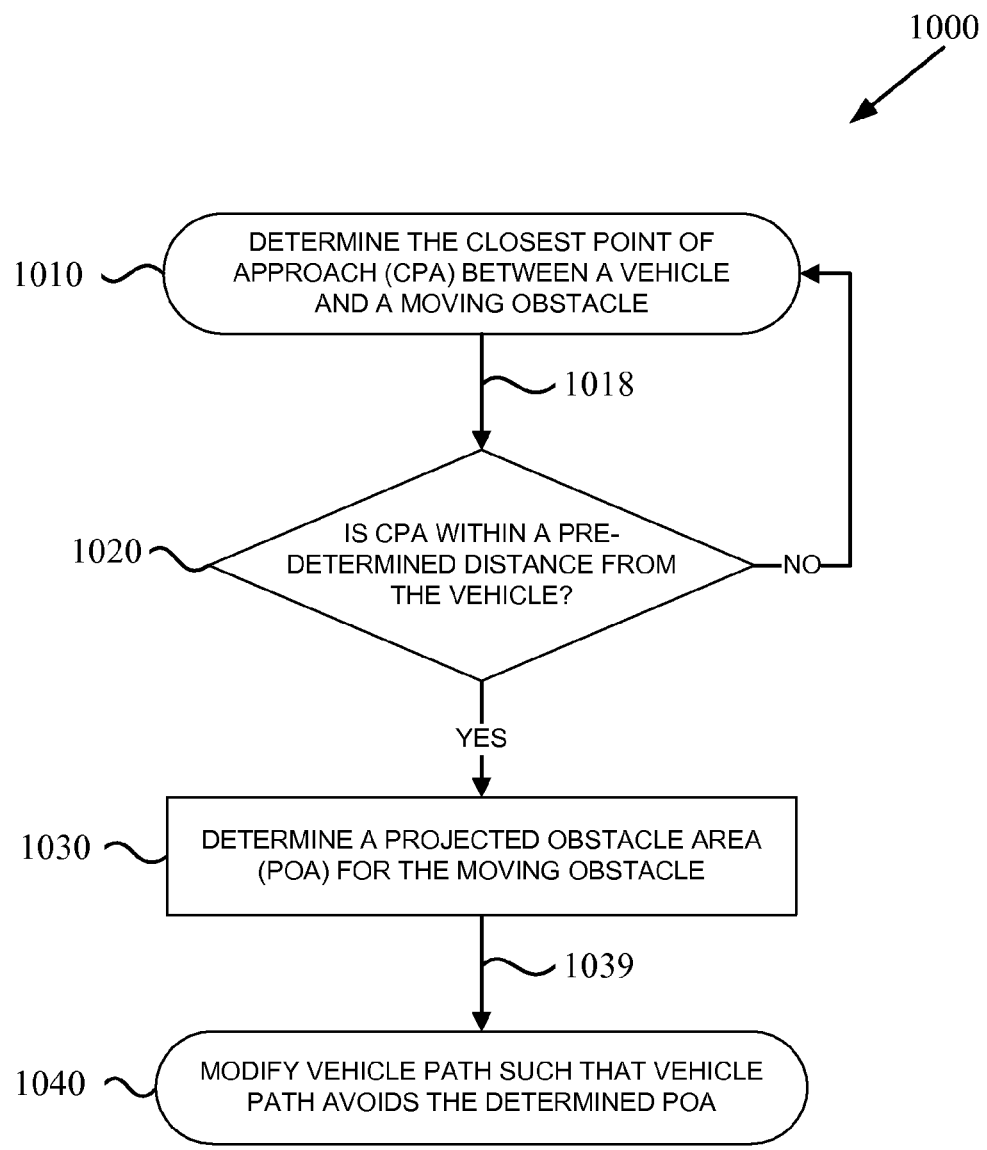
FIG. 11 shows a flowchart of an embodiment of the Method for Determining Projected Obstacle Areas for Moving Obstacles.

FIG. 11 shows a flowchart of an embodiment 1000 of the Method for Determining Projected Obstacle Areas for Moving Obstacles. For illustrative purposes, method 1000 will be discussed with reference to OAS 800. However, method 1000 may be implemented by other embodiments of obstacle avoidance systems, such as OAS 900 described herein. In some embodiments, the steps of method 1000 are performed using software stored in processing module 820. In some embodiments, the steps of method 1000 are performed using software stored in memory 880.

Method 1000 may begin at step 1010, which involves determining a CPA between a vehicle traveling along a vehicle path and at least one moving obstacle traveling along an obstacle path. As an example, the determination may be made by processing module 820. The vehicle path may have more than one vehicle path segments. Each vehicle path segments may comprise at least one vehicle path portion. The closest point of approach exists along the obstacle path. The vehicle has a vehicle heading and a vehicle velocity and the moving obstacle has an obstacle heading and an obstacle velocity. Step 1010 is discussed in more detail with respect to FIG. 12 below. Method 1000 may then proceed to step 1020, which involves determining whether or not the closest point of approach is within a pre-determined distance from the vehicle at a point in time along the vehicle path. As an example, the determination may be made by processing module 820. If the closest point of approach is not within a pre-determined distance from the vehicle at a point in time along the vehicle path, method 1000 may return to step 1010. If the closest point of approach is within a pre-determined distance from the vehicle at a point in time along the vehicle path, method 1000 may proceed to step 1030, which involves determining a projected obstacle area for the moving obstacle. Step 1030 is discussed in more detail with respect to FIG. 13 below.

Method 1000 may then proceed to step 1040, which involves modifying the vehicle path such that the vehicle avoids the POA. As an example, step 1040 may be performed by processing module 820. In some embodiments, step 1040 may include causing a component of a OAS 800 to modify the vehicle path such that the vehicle path avoids the POA. In some embodiments, this includes modifying the vehicle path such that a vehicle region avoids the POA, wherein the vehicle region comprises the region surrounding the vehicle and extending a distance comprised of a pre-determined distance set by a user. Such a modification may occur by processing module 820 transmitting a signal to NAV module 830, which may then send a signal to the actuators responsible for controlling the steering of the vehicle.

Figure 12:
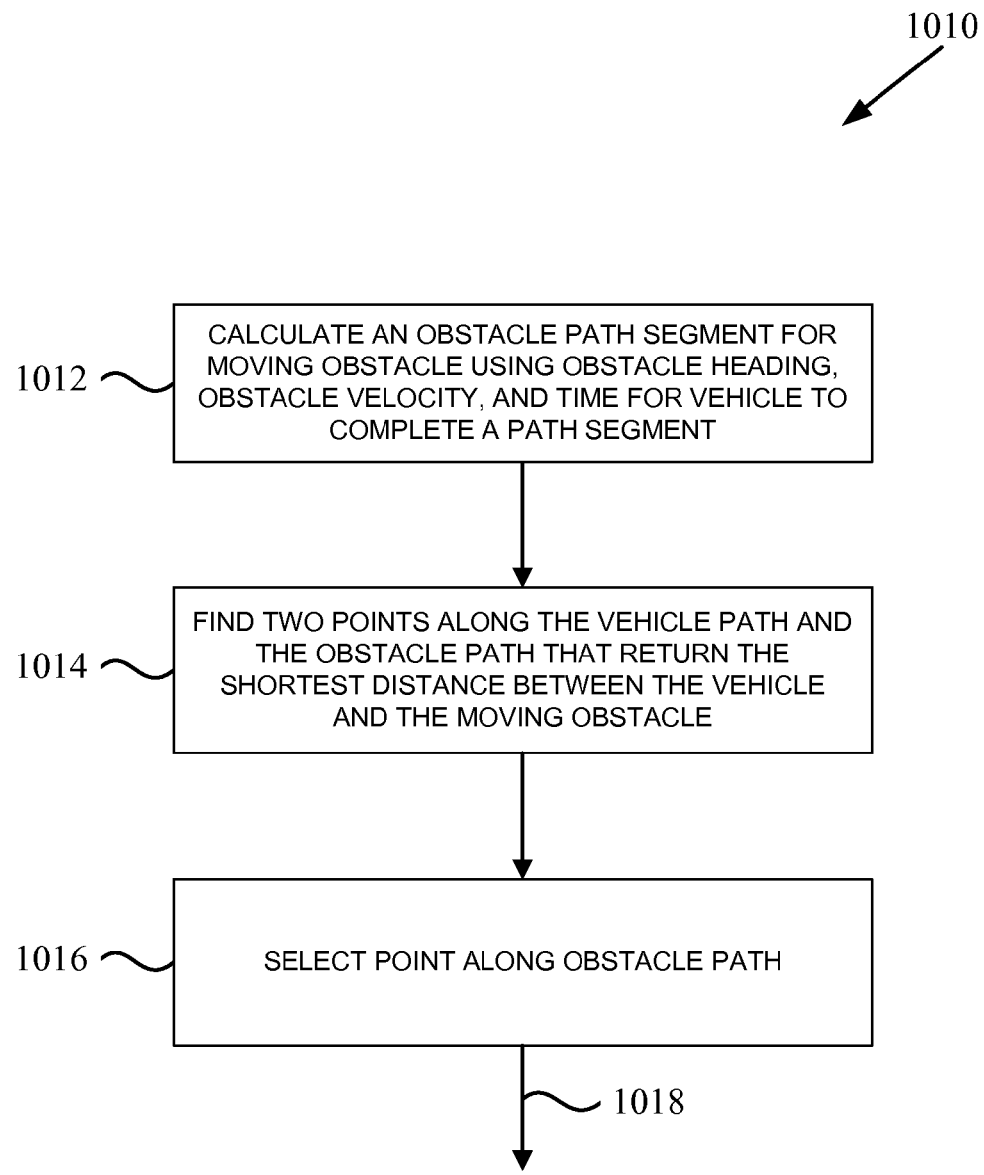
FIG. 12 shows a flowchart of an embodiment of the step for determining the closest point of approach between a vehicle and a moving obstacle, in accordance with the Method for Determining Projected Obstacle Areas for Moving Obstacles.

FIG. 12 shows a flowchart of an embodiment of step 1010 of method 1000. Step 1010 may begin at step 1012, which involves calculating an obstacle path segment for the moving obstacle. In some embodiments, the calculation of the obstacle path segment may be made using the obstacle heading, the obstacle velocity, and the time for the vehicle to complete a vehicle path segment. As an example, the step 1012 may be performed by processing module 820. Step 1010 may then proceed to step 1014, which involves finding two points, one point along the vehicle path and the other point along the obstacle path, in relation to the vehicle heading, the vehicle velocity, the obstacle heading, and the obstacle velocity, that return the shortest distance between the vehicle and the moving obstacle. As an example, the step 1014 may be performed by processing module 820. Step 1010 may then proceed to step 1016, which involves selecting the point along the obstacle path, wherein the CPA is the point along the obstacle path. As an example, the step 1016 may be performed by processing module 820. Following step 1016, method 1000 may proceed to step 1020 along flow path 1018.

Figure 13:
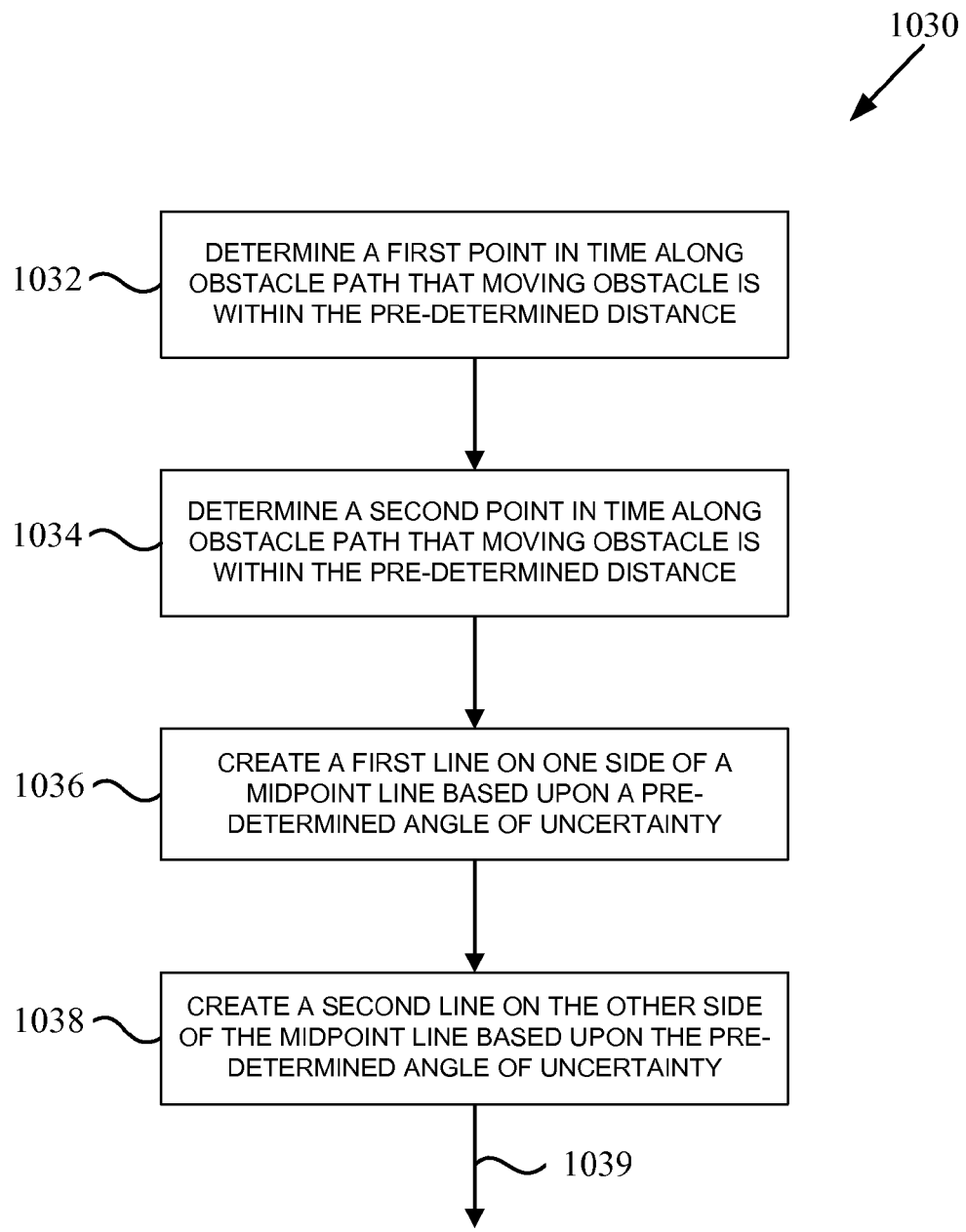
FIG. 13 shows a flowchart of an embodiment of the step for determining a projected obstacle area for a moving obstacle, in accordance with the Method for Determining Projected Obstacle Areas for Moving Obstacles.

FIG. 13 shows a flowchart of an embodiment of step 1030 of method 1000. Step 1030 may begin at step 1032, which involves determining a first point in time along the obstacle path that the moving obstacle is within the pre-determined distance from the vehicle. In some embodiments, the first point in time is farther from the vehicle than the closest point of approach. In some embodiments, the first point in time is the first point in time in which the moving obstacle is within the pre-determined distance from the vehicle. As an example, the step 1032 may be performed by processing module 820. Step 1030 may then proceed to step 1034, which involves determining a second point in time along the obstacle path that the moving obstacle is within the pre-determined distance from the vehicle. In some embodiments, the second point in time is farther from the first point in time than the closest point of approach. In some embodiments, the second point in time is the last point in time in which the moving obstacle is within the pre-determined distance from the vehicle. As an example, the step 1034 may be performed by processing module 820.

Step 1030 may then proceed to step 1036, which involves creating a first line on one side of a midpoint line based upon a pre-determined angle of uncertainty. The midpoint line may extend at least from the first point in time through the closest point of approach to the second point in time. The pre-determined angle of uncertainty may be measured from the second point in time. As an example, the step 1036 may be performed by processing module 820. Step 1030 may then proceed to step 1038, which involves creating a second line on the other side of the midpoint line based upon the pre-determined angle of uncertainty. As an example, the step 1038 may be performed by processing module 820. The POA comprises the polygonal region between the CPA, the first point in time, the first line, and the second line. Following step 1038, method 1000 may next proceed to step 1040 along flow path 1039. In some embodiments, it may be necessary for method 1000 to perform several iterations of step 1030 to return a vehicle path that successfully avoids a moving obstacle.

Figure 14:
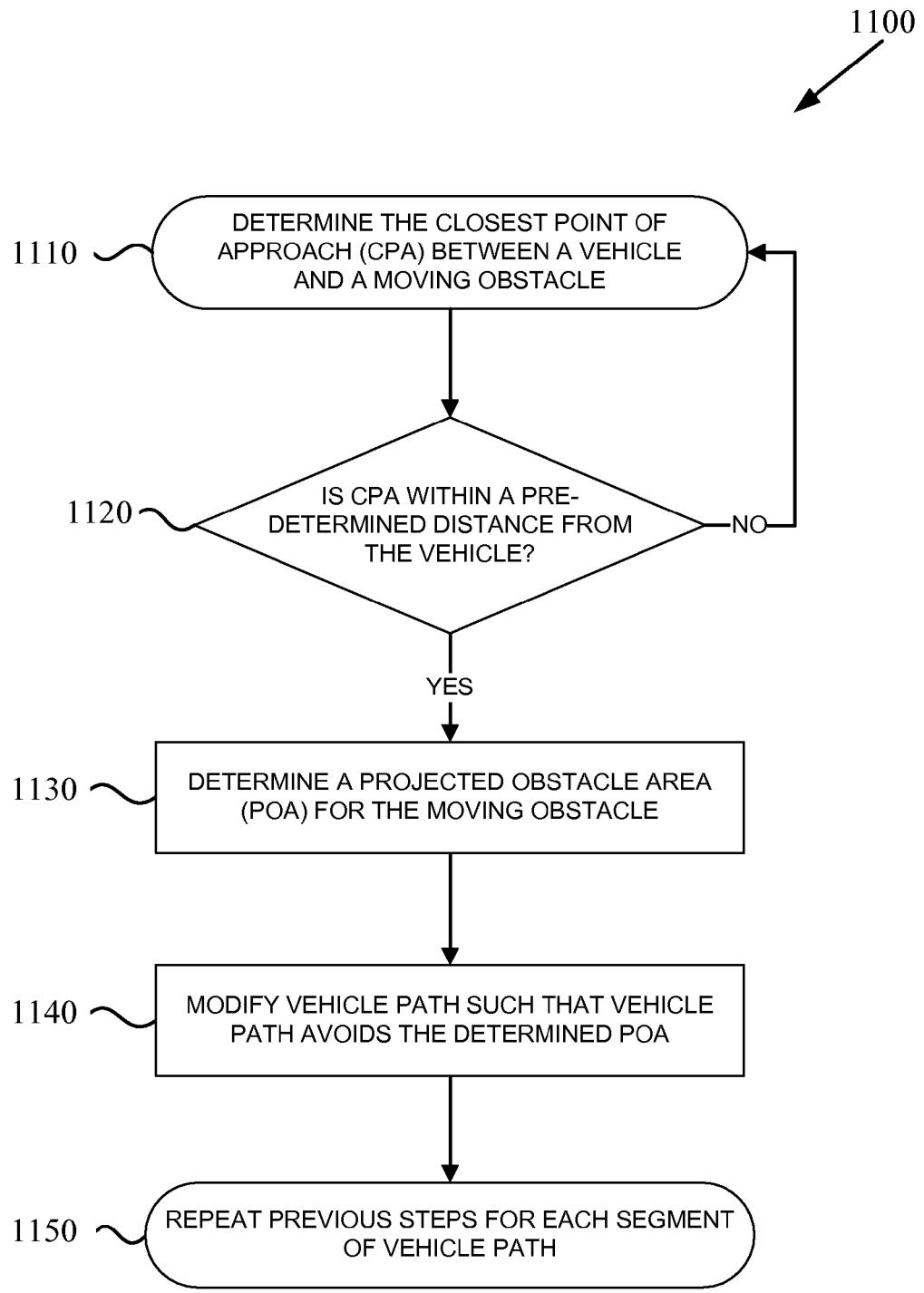
FIG. 14 shows a flowchart of an embodiment of the Method for Determining Projected Obstacle Areas for Moving Obstacles.

FIG. 14 shows a flowchart of an embodiment 1100 of the Method for Determining Projected Obstacle Areas for Moving Obstacles. For illustrative purposes, method 1100 will be discussed with reference to OAS 800. However, method 1100 may be implemented by other embodiments of obstacle avoidance systems, such as OAS 900 described herein. In some embodiments, the steps of method 1100 are performed using software stored in processing module 820. In some embodiments, the steps of method 1100 are performed using software stored in memory 880.

Method 1100 may begin at step 1110, which involves determining a CPA between a vehicle traveling along a vehicle path and at least one moving obstacle traveling along an obstacle path. The vehicle path may have more than one vehicle path segments. Each vehicle path segments may comprise at least one vehicle path portion. The CPA exists along the obstacle path. The vehicle has a vehicle heading and a vehicle velocity and the moving obstacle has an obstacle heading and an obstacle velocity. As an example, the step 1110 may be performed by processing module 820. Method 1100 may then proceed to step 1120, which involves determining whether or not the CPA is within a pre-determined distance from the vehicle at a point in time along the vehicle path. If the CPA is not within a pre-determined distance from the vehicle at a point in time along the vehicle path, method 1100 may return to step 1110. If the CPA is within a pre-determined distance from the vehicle at a point in time along the vehicle path, method 1100 may proceed to step 1130, which involves determining a POA for the moving obstacle. The determination at step 1130 may be made similar to step 1030 as discussed herein.

Method 1100 may then proceed to step 1140, which involves modifying the vehicle path such that the vehicle avoids the POA. In some embodiments, step 1140 may include causing a component of an obstacle avoidance system to modify the vehicle path such that the vehicle path avoids the POA. In some embodiments, this includes modifying the vehicle path such that a vehicle region avoids the POA, wherein the vehicle region comprises the region surrounding the vehicle and extending a distance comprised of the pre-determined distance. As an example, the step 1140 may be performed by processing module 820. Method 1100 may then proceed to step 1150, which involves repeating steps 1110 through 1140 for each segment of the vehicle path.

Figure 15:
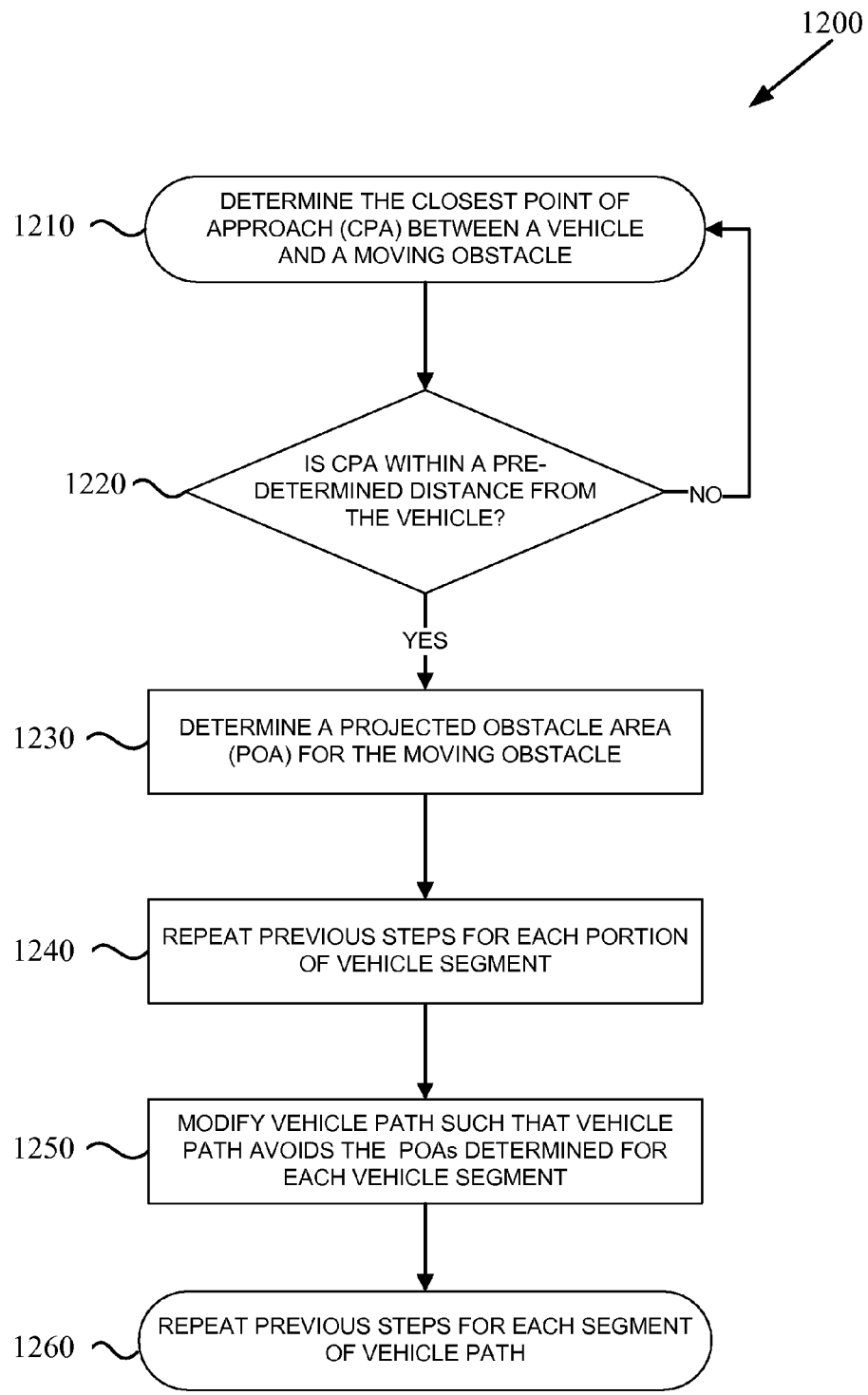
FIG. 15 shows a flowchart of an embodiment of the Method for Determining Projected Obstacle Areas for Moving Obstacles.

FIG. 15 shows a flowchart of an embodiment 1200 of the Method for Determining Projected Obstacle Areas for Moving Obstacles. For illustrative purposes, method 1200 will be discussed with reference to OAS 800. However, method 1200 may be implemented by other embodiments of obstacle avoidance systems, such as OAS 900 described herein. In some embodiments, the steps of method 1200 are performed using software stored in processing module 820. In some embodiments, the steps of method 1200 are performed using software stored in memory 880.

Method 1200 may begin at step 1210, which involves determining a CPA between a vehicle traveling along a vehicle path and at least one moving obstacle traveling along an obstacle path. The vehicle path may have more than one vehicle path segments. Each vehicle path segments may comprise at least one vehicle path portion. The CPA exists along the obstacle path. The vehicle has a vehicle heading and a vehicle velocity and the moving obstacle has an obstacle heading and an obstacle velocity. As an example, the step 1210 may be performed by processing module 820. Method 1200 may then proceed to step 1220, which involves determining whether or not the CPA is within a pre-determined distance from the vehicle at a point in time along the vehicle path. If the CPA is not within a pre-determined distance from the vehicle at a point in time along the vehicle path, method 1200 may return to step 1210. If the CPA is within a pre-determined distance from the vehicle at a point in time along the vehicle path, method 1200 may proceed to step 1230, which involves determining a POA for the moving obstacle. The determination at step 1230 may be made similar to steps 1030 and 1130 as discussed herein. Method 1200 may then proceed to step 1240, which involves repeating steps 1210 through 1230 for each vehicle path portion of a vehicle path segment. As an example, the step 1240 may be performed by processing module 820.

Method 1200 may then proceed to step 1250, which involves modifying the vehicle path such that the vehicle avoids the POAs determined for each vehicle path segment. In some embodiments, step 1250 may include causing a component of an obstacle avoidance system to modify the vehicle path such that the vehicle path avoids the POA. In some embodiments, this includes modifying the vehicle path such that a vehicle region avoids the POA, wherein the vehicle region comprises the region surrounding the vehicle and extending a distance comprised of the pre-determined distance. As an example, the step 1250 may be performed by processing module 820. Method 1200 may then proceed to step 1260, which involves repeating steps 1210 through 1250 for each vehicle path segment of the vehicle path. As an example, the step 1260 may be performed by processing module 820.

Many modifications and variations of the Method for Determining Projected Obstacle Areas for Moving Obstacles are possible in light of the above description. Therefore, within the scope of the appended claims, the Method for Determining Projected Obstacle Areas for Moving Obstacles may be practiced otherwise than as specifically described. Further, the scope of the claims is not limited to the implementations and embodiments disclosed herein, but extends to other implementations and embodiments as may be contemplated by those having ordinary skill in the art.

We claim:

1. A method comprising the steps of:
   determining a closest point of approach between a vehicle traveling along a vehicle path and at least one moving obstacle traveling along an obstacle path, the vehicle path having more than one vehicle path segments, the closest point of approach being along the obstacle path, the vehicle having a vehicle heading and a vehicle velocity and the moving obstacle having an obstacle heading and an obstacle velocity;
   determining that the closest point of approach is within a pre-determined distance from the vehicle at a point in time along the vehicle path;
   determining a projected obstacle area for the moving obstacle, the determination comprising
      determining a first point in time along the obstacle path that the moving obstacle is within the pre-determined distance from the vehicle, the first point in time being farther from the vehicle than the closest point of approach,
      determining a second point in time along the obstacle path that the moving obstacle is within the pre-determined distance from the vehicle, the second point in time being farther from the first point in time than the closest point of approach,
      creating a first line on one side of a midpoint line based upon a pre-determined angle of uncertainty, the midpoint line extending from the first point in time through the closest point of approach to the second point in time, the pre-determined angle of uncertainty measured from the first point in time, and
      creating a second line on the other side of the midpoint line based upon the pre-determined angle of uncertainty
      wherein the projected obstacle area comprises the polygonal region between the closest point of approach, the second point in time, the first line, and the second line; and
   modifying the vehicle path such that the vehicle avoids the projected obstacle area.

2. The method of claim 1, wherein the step of determining a closest point of approach comprises the steps of:
   calculating an obstacle path segment for the moving obstacle using the obstacle heading, the obstacle velocity, and the time for the vehicle to complete a vehicle path segment;
   finding two points, one point along the vehicle path and the other point along the obstacle path, in relation to the vehicle heading, the vehicle velocity, the obstacle heading, and the obstacle velocity, that return the shortest distance between the vehicle and the moving obstacle; and
   selecting the point along the obstacle path, wherein the closest point of approach is the point along the obstacle path.

3. The method of claim 1 further comprising the step of, for each segment of the vehicle path, repeating the steps of determining a closest point of approach between a vehicle traveling along a vehicle path and at least one moving obstacle traveling along an obstacle path, determining that the closest point of approach is within a pre-determined distance from the vehicle at a point in time along the vehicle path, determining a projected obstacle area for the moving obstacle, and modifying the vehicle path such that the vehicle avoids the projected obstacle area.

4. The method of claim 1, wherein the vehicle path and the obstacle path do not intersect.

5. The method of claim 1 further comprising the step of modifying the projected obstacle area based on the rules of the vehicle's operating environment.

6. The method of claim 5, wherein the vehicle's operating environment is a water-based environment.

7. The method of claim 6, wherein the step of modifying the projected obstacle area based on the rules of the vehicle's operating environment includes increasing the uncertainty angle on at least one side of the projected obstacle area.

8. The method of claim 6, wherein the step of modifying the projected obstacle area based on the rules of the vehicle's operating environment includes increasing the ahead distance of the projected obstacle area.

9. The method of claim 6, wherein the step of modifying the projected obstacle area based on the rules of the vehicle's operating environment includes increasing the astern distance of the projected obstacle area.

10. The method of claim 1, wherein the projected obstacle area is determined based upon the vehicle path and the time required by the vehicle to traverse the vehicle path.

11. The method of claim 1 further comprising the step of updating the projected obstacle area after a pre-determined time period.

12. The method of claim 1, wherein the first point in time is the first point in time in which the moving obstacle is within the pre-determined distance from the vehicle.

13. The method of claim 1, wherein the second point in time is the last point in time in which the moving obstacle is within the pre-determined distance from the vehicle.

14. The method of claim 1, wherein the step of modifying the vehicle path such that the vehicle path avoids the projected obstacle area includes modifying the vehicle path such that a vehicle region avoids the projected obstacle area, wherein the vehicle region comprises the region surrounding the vehicle and extending a distance comprised of the pre-determined distance.

15. A non-transitory computer readable storage medium having a method encoded thereon, the method represented by computer readable programming code, the method comprising the steps of:

determining a closest point of approach between a vehicle traveling along a vehicle path and at least one moving obstacle traveling along an obstacle path, the closest point of approach being along the obstacle path, the vehicle having a vehicle heading and a vehicle velocity and the moving obstacle having an obstacle heading and an obstacle velocity;

determining that the closest point of approach is within a pre-determined distance from the vehicle at a point in time along the vehicle path; and determining a projected obstacle area for the moving obstacle, the determination comprising determining a first point in time along the obstacle path that the moving obstacle is within the pre-determined distance from the vehicle, the first point in time being farther from the vehicle than the closest point of approach, determining a second point in time along the obstacle path that the moving obstacle is within the pre-determined distance from the vehicle, the second point in time being farther from the first point in time than the closest point of approach, creating a first line on one side of a midpoint line based upon a pre-determined angle of uncertainty, the midpoint line extending from the first point in time through the closest point of approach to the second point in time, the pre-determined angle of uncertainty measured from the first point in time, and creating a second line on the other side of the midpoint line based upon the pre-determined angle of uncertainty wherein the projected obstacle area comprises the polygonal region between the closest point of approach, the second point in time, the first line, and the second line.

16. The non-transitory computer readable storage medium of claim 15, wherein the step of determining a closest point of approach comprises the steps of:

calculating an obstacle path segment for the moving obstacle using the obstacle heading, the obstacle velocity, and the time for the vehicle to complete a vehicle path segment;

finding two points, one point along the vehicle path and the other point along the obstacle path, in relation to the vehicle heading, the vehicle velocity, the obstacle heading, and the obstacle velocity, that return the shortest distance between the vehicle and the moving obstacle; and selecting the point along the obstacle path, wherein the closest point of approach is the point along the obstacle path.

17. The non-transitory computer readable storage medium of claim 15, wherein the method further comprises the step of modifying the projected obstacle area based on the rules of the vehicle's operating environment.

18. The non-transitory computer readable storage medium of claim 17, wherein the vehicle's operating environment is a water-based environment.

19. The non-transitory computer readable storage medium of claim 15, wherein the method further comprises the step of updating the projected obstacle area after a pre-determined time period.

20. The non-transitory computer readable storage medium of claim 15, wherein the first point in time is the first point in which the moving obstacle is within the pre-determined distance from the vehicle and the second point in time is the last point in which the moving obstacle is within the pre-determined distance from the vehicle.

21. The non-transitory computer readable storage medium of claim 15, wherein the method further comprises the step of modifying the vehicle path such that the vehicle avoids the projected obstacle area.

22. A system comprising:

a processor; and a memory module operatively connected to the processor, the memory module having program instructions stored therein, wherein the program instructions are executable by the processor to perform a method comprising the steps of:

determining a closest point of approach between a vehicle traveling along a vehicle path and at least one moving obstacle traveling along an obstacle path, the closest point of approach being along the obstacle path, the vehicle having a vehicle heading and a vehicle velocity and the moving obstacle having an obstacle heading and an obstacle velocity;

determining that the closest point of approach is within a pre-determined distance from the vehicle at a point in time along the vehicle path; and determining a projected obstacle area for the moving obstacle, the determination comprising determining a first point in time along the obstacle path that the moving obstacle is within the pre-determined distance from the vehicle, the first point in time being farther from the vehicle than the closest point of approach, determining a second point in time along the obstacle path that the moving obstacle is within the pre-determined distance from the vehicle, the second point in time being farther from the first point in time than the closest point of approach, creating a first line on one side of a midpoint line based upon a pre-determined angle of uncertainty, the midpoint line extending from the first point in time through the closest point of approach to the second point in time, the pre-determined angle of uncertainty measured from the first point in time, and creating a second line on the other side of the midpoint line based upon the pre-determined angle of uncertainty wherein the projected obstacle area comprises the polygonal region between the closest point of approach, the second point in time, the first line, and the second line.

23. The system of claim 22, wherein the step of determining a closest point of approach comprises the steps of:

calculating an obstacle path segment for the moving obstacle using the obstacle heading, the obstacle velocity, and the time for the vehicle to complete a vehicle path segment;

finding two points, one point along the vehicle path and the other point along the obstacle path, in relation to the vehicle heading, the vehicle velocity, the obstacle heading, and the obstacle velocity, that return the shortest distance between the vehicle and the moving obstacle; and selecting the point along the obstacle path, wherein the closest point of approach is the point along the obstacle path.

24. The system of claim 22, wherein the method further comprises the step of modifying the vehicle path such that the vehicle avoids the projected obstacle area.

25. The system of claim 24, wherein the step of modifying the vehicle path such that the vehicle path avoids the projected obstacle area comprises the step of causing a component to modify the vehicle path such that the vehicle path avoids the projected obstacle area.

26. The system of claim 24, wherein the step of modifying the vehicle path such that the vehicle path avoids the projected obstacle area includes modifying the vehicle path such that a vehicle region avoids the projected obstacle area, wherein the vehicle region comprises the region surrounding the vehicle and extending a distance comprised of the pre-determined distance.

27. The system of claim 22, wherein the method further comprises the step of modifying the projected obstacle area based on the rules of the vehicle's operating environment, wherein the vehicle's operating environment is a water-based environment.

28. A method comprising the steps of:
   a) determining a closest point of approach between a vehicle traveling along a vehicle path and at least one moving obstacle traveling along an obstacle path, the vehicle path having more than one vehicle path segments each comprising at least one vehicle path portion, the closest point of approach being along the obstacle path, the vehicle having a vehicle heading and a vehicle velocity and the moving obstacle having an obstacle heading and an obstacle velocity;
   b) determining that the closest point of approach is within a pre-determined distance from the vehicle at a point in time along the vehicle path;
   c) determining a projected obstacle area for the moving obstacle, the determination comprising
      determining a first point in time along the obstacle path that the moving obstacle is within the pre-determined distance from the vehicle, the first point in time being farther from the vehicle than the closest point of approach,
      determining a second point in time along the obstacle path that the moving obstacle is within the pre-determined distance from the vehicle, the second point in time being farther from the first point in time than the closest point of approach,
      creating a first line on one side of a midpoint line based upon a pre-determined angle of uncertainty, the midpoint line extending from the first point in time through the closest point of approach to the second point in time, the pre-determined angle of uncertainty measured from the first point in time, and
      creating a second line on the other side of the midpoint line based upon the pre-determined angle of uncertainty
      wherein the projected obstacle area comprises the polygonal region between the closest point of approach, the second point in time, the first line, and the second line;
   d) repeating steps (a) through (c) for each vehicle path portion of a vehicle path segment;
   e) modifying the vehicle path such that the vehicle avoids the projected obstacle areas determined for each vehicle path segment; and
   f) repeating steps (a) through (e) for each vehicle path segment of the vehicle path.

* * * * *